United States Patent
Takahashi et al.

(10) Patent No.: US 7,471,316 B2
(45) Date of Patent: Dec. 30, 2008

(54) IMAGE CAPTURE DEVICE CAPABLE OF FLICKER DETECTION

(75) Inventors: Seiji Takahashi, Yokohama (JP); Akira Okawa, Yokohama (JP); Noriyuki Uenishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 11/250,428

(22) Filed: Oct. 17, 2005

(65) Prior Publication Data
US 2006/0279641 A1 Dec. 14, 2006

(30) Foreign Application Priority Data
Jun. 13, 2005 (JP) .............................. 2005-172347

(51) Int. Cl.
H04N 9/73 (2006.01)
H04N 7/01 (2006.01)
H04N 11/20 (2006.01)

(52) U.S. Cl. .................................... 348/226.1; 348/447

(58) Field of Classification Search .............. 348/226.1, 348/241, 447, 910, 227.1, 228.1
See application file for complete search history.

(56) References Cited

U.S. PATENT DOCUMENTS

| | | | |
|---|---|---|---|
| 6,700,609 B1 | 3/2004 | Abe | |
| 7,142,234 B2 * | 11/2006 | Kaplinsky et al. | 348/226.1 |
| 7,187,405 B2 * | 3/2007 | Poplin et al. | 348/226.1 |
| 7,298,401 B2 * | 11/2007 | Baer | 348/226.1 |
| 2002/0044205 A1 * | 4/2002 | Nagaoka et al. | 348/229 |
| 2004/0165084 A1 * | 8/2004 | Yamamoto et al. | 348/226.1 |
| 2006/0061669 A1 * | 3/2006 | Jang et al. | 348/226.1 |
| 2006/0132859 A1 * | 6/2006 | Kalapathy et al. | 358/463 |
| 2007/0153094 A1 * | 7/2007 | Noyes et al. | 348/226.1 |
| 2007/0182831 A1 * | 8/2007 | Katoh et al. | 348/226.1 |

FOREIGN PATENT DOCUMENTS

| | | | |
|---|---|---|---|
| JP | 62289735 A | * | 12/1987 |
| JP | 06276415 A | * | 9/1994 |
| JP | 2001-119708 A | | 4/2001 |
| JP | 2002-84466 A | | 3/2002 |
| JP | 2003-189129 A | | 7/2003 |
| KR | 2001-0034227 A | | 4/2001 |
| WO | WO 0205548 A1 | * | 1/2002 |

* cited by examiner

Primary Examiner—John M Villecco
(74) Attorney, Agent, or Firm—Arent Fox LLP

(57) ABSTRACT

The invention is an image capture device having an image capture element. The device further includes a flicker detection portion which extracts flicker component signals corresponding to periodic changes in brightness in an image capture environment from image signals for each frame supplied by the image capture element, performs correction to remove signals at or below a prescribed reference low-amplitude value, and detects the frequency or the period of the flicker component from the peaks and valleys of the corrected flicker component signal.

9 Claims, 9 Drawing Sheets

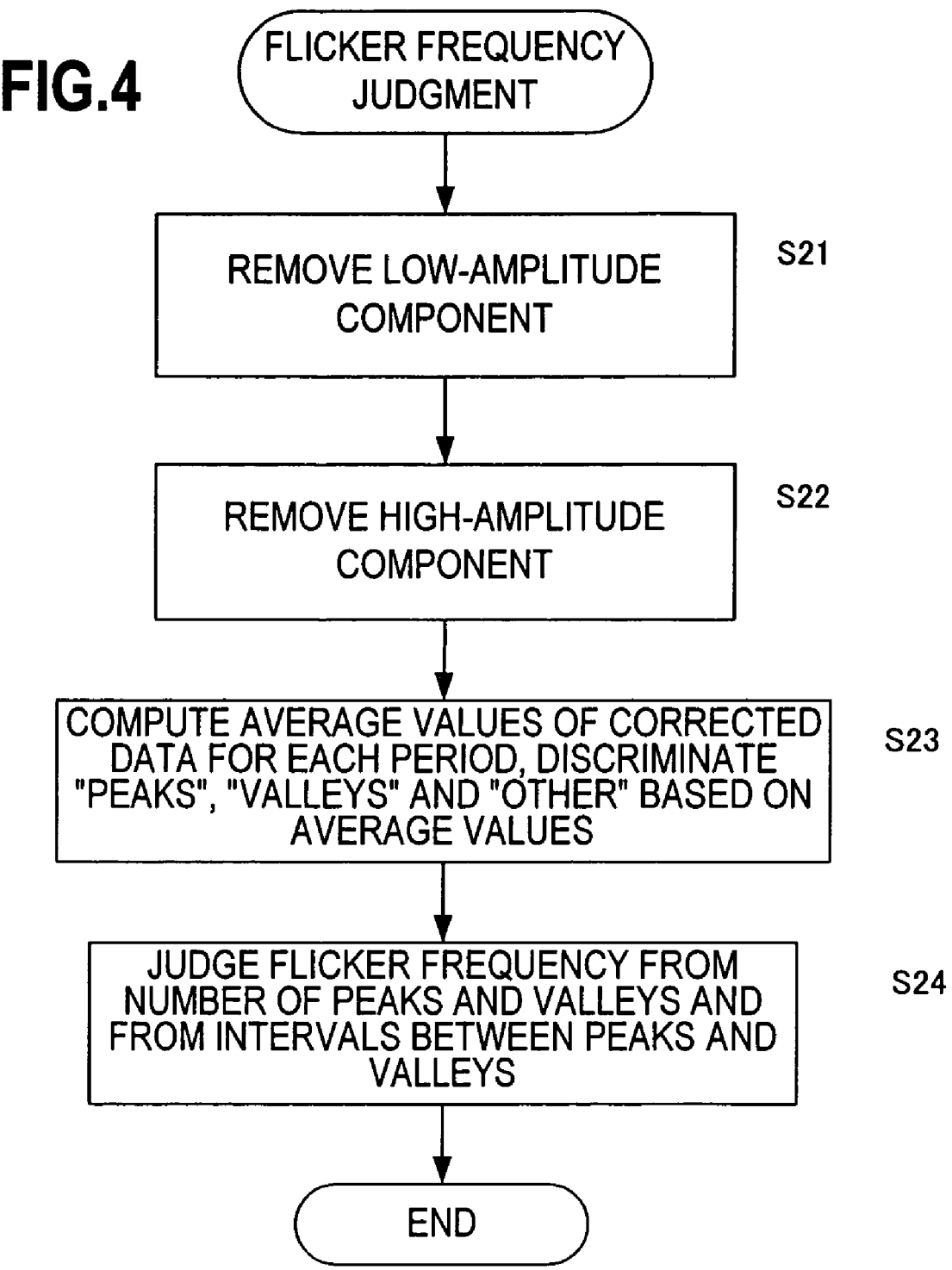

—VALLEY———VALLEY—PEAK—VALLEY———VALLEY (1)  -P-V-P----V-----P-----V---P-V-P---V---P-----V--
(2)  -P---P----V-----P-----V---P---P---V---P-----V--

P: PEAK
V: VALLEY

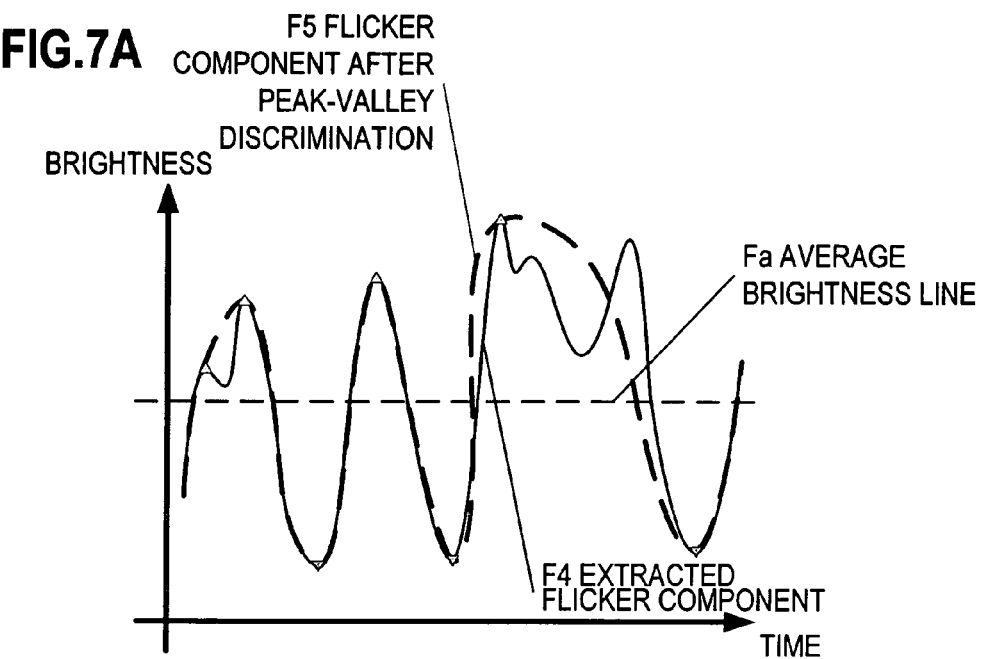
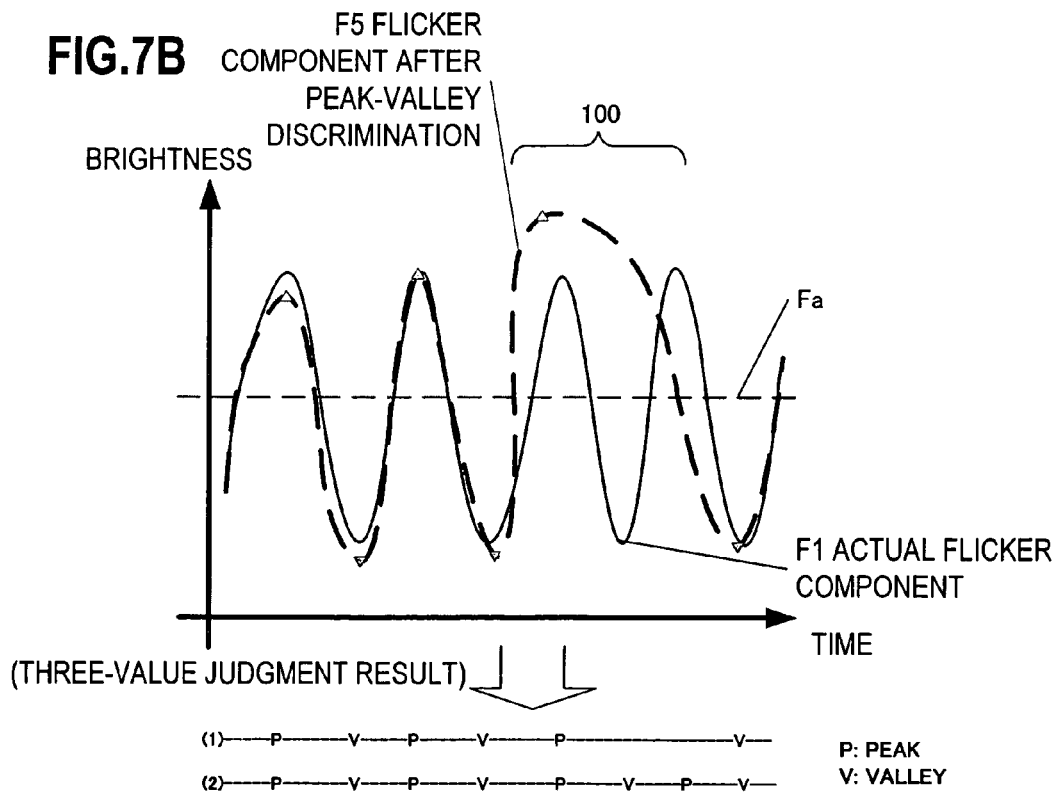

(THREE-VALUE JUDGMENT RESULT)

——PEAK——VALLEY——PEAK——VALLEY——PEAK–VALLEY–PEAK–VALLEY——

IMAGE CAPTURE DEVICE CAPABLE OF FLICKER DETECTION

CROSS-REFERENCE TO RELATED APPLICATIONS

This application is based upon and claims the benefit of priority from the prior Japanese Patent Application No. 2005-172347, filed on Jun. 13, 2005, the entire contents of which are incorporated herein by reference.

BACKGROUND OF THE INVENTION

1. Field of the Invention

This invention relates to an image capture device having an XY address-type image capture element, and in particular to an image capture device capable of detecting flicker due to a commercial power supply, such as through fluorescent lights.

2. Description of the Related Art

In recent years, image capture devices which capture still images, such as digital still cameras, have begun to use XY address-type MOS image capture device, like CMOS image sensors. A CMOS image sensor has a simple structure and can be manufactured at low cost, providing high image quality with low power consumption; but because the timing with which photoelectric conversion is performed is different for each pixel (or more precisely, for each line), when image capture is performed under fluorescent lighting or in some other environment in which the brightness changes periodically, bright-dark horizontal stripes occur in captured images. The horizontal stripes in such captured images is called "flicker".

In order to suppress this flicker, it has been proposed that the occurrence of flicker be detected, and when flicker is occurring, the exposure time (shutter speed) be controlled according to the flicker frequency. Also, various methods have been proposed for detecting the occurrence of flicker, and also judging the flicker frequency (commercial power supply frequency of 50 Hz or 60 Hz). See for example Japanese Patent Laid-open No. 2003-189129, Japanese Patent Laid-open No. 2002-84466, and Japanese Patent Laid-open No. 2001-119708. Of the above patent references, in Japanese Patent Laid-open No. 2003-189129 the flicker component is extracted from image signals obtained from a CMOS image sensor, the portions with high and low brightness in the flicker component are judged to be "peaks" and "valleys", and from the number and intervals between the "peaks" and "valleys", the flicker frequency is estimated. Extraction of the flicker component is performed by taking the difference between the image signals of preceding and succeeding frames to remove image signals of objects contained in the image signals.

SUMMARY OF THE INVENTION

However, the flicker detection method and flicker frequency detection method disclosed in Japanese Patent Laid-open No. 2003-189129 is premised on the assumption that the extracted flicker component always has an ideal flicker component waveform, so that in some cases application to an actual image signal is difficult. First, for example, when there are weak changes in brightness in sync with the frequency of the commercial power supply, as in the case of incandescent lighting, there may not be a need to control the exposure time according to flicker occurrence. This is because the horizontal stripes resulting from the brightness changes are not very noticeable. But if flicker occurrence is detected corresponding to such weak periodic changes in brightness, the exposure time must be controlled according to the flicker frequency, and degradation of the image quality may result. Second, there are cases in which, due to high-speed motion of an object during image capture or high-speed motion of an image capture range, the object image differs in consecutive frames, and a high-brightness image is included in only one of the frame images. In such cases, the signal frequency of the flicker component extracted from the differences in consecutive frames is very different from that of an ideal waveform, and it becomes difficult to judge whether flicker exists, and difficult to detect the flicker frequency.

Hence an object of the invention is to provide an image capture device having an image capture element enabling highly precise flicker detection.

In order to achieve the above object, a first aspect of the invention is an image capture device having an image capture element, the device further comprising a flicker detection portion which extracts flicker component signals corresponding to periodic changes in brightness in an image capture environment from image signals for each frame supplied by the image capture element, performs correction to remove signals at or below a prescribed reference low-amplitude value, and detects the frequency or the period of the flicker component from the peaks and valleys of the corrected flicker component signal.

By means of the first aspect, the weak brightness changes of an incandescent light or similar can be removed from the flicker component signal, so that unnecessary flicker detection can be avoided.

In order to achieve the above object, a second aspect of the invention is an image capture device having an image capture element, the device further comprising a flicker detection portion which extracts flicker component signals corresponding to periodic changes in brightness in an image capture environment from image signals for each frame supplied by the image capture element, performs correction to remove signals at or above a prescribed reference high-amplitude value, and detects the frequency or the period of the flicker component from the peaks and valleys of the corrected flicker component signal.

For example, in cases in which flicker component signals are extracted by taking the difference between the image signals of consecutive frames, there are cases in which an object image in the image signals of consecutive frames differs, and the object signals in one frame remain in the flicker component signals, which are different components. When the remaining object signals are of high brightness, large-amplitude values are contained in the flicker component signals, and the peaks and valleys of the flicker component signals cannot be appropriately detected. By means of the above second aspect, such high-brightness noise components can be removed, so that the peaks and valleys of the flicker component signals can be appropriately detected.

In order to achieve the above object, a third aspect of the invention is an image capture device having an image capture element, the device further comprising a flicker detection portion which extracts flicker component signals corresponding to periodic changes in brightness in an image capture environment from image signals for each frame supplied by the image capture element, discriminates the peaks and valleys of the flicker component signals with reference to average values over each period of the flicker component signals, and detects the frequency or period of the flicker component from the discriminated peaks and valleys.

By means of the third aspect, even when extracted flicker component signals includes waveform components differing from ideal signals, by discriminating portions higher and lower than the average values for each period as peaks and valleys respectively, the peaks and valleys of the flicker component can be appropriately discriminated.

By means of this invention, an extracted flicker component signal can be corrected appropriately, and because a judgment reference value is used with respect to a distortion waveform, the peaks and valleys of flicker component signals can be appropriately discriminated, and the presence of a flicker component, as well as the frequency, can be accurately detected.

BRIEF DESCRIPTION OF THE DRAWINGS

FIG. 4 is a flowchart of a flicker frequency discrimination process of an embodiment;

FIGS. 7A and 7B show the flicker component after peak/valley discrimination, for the flicker component in (B) of FIG. 6;

DESCRIPTION OF THE PREFERRED EMBODIMENTS

Figure 1A:
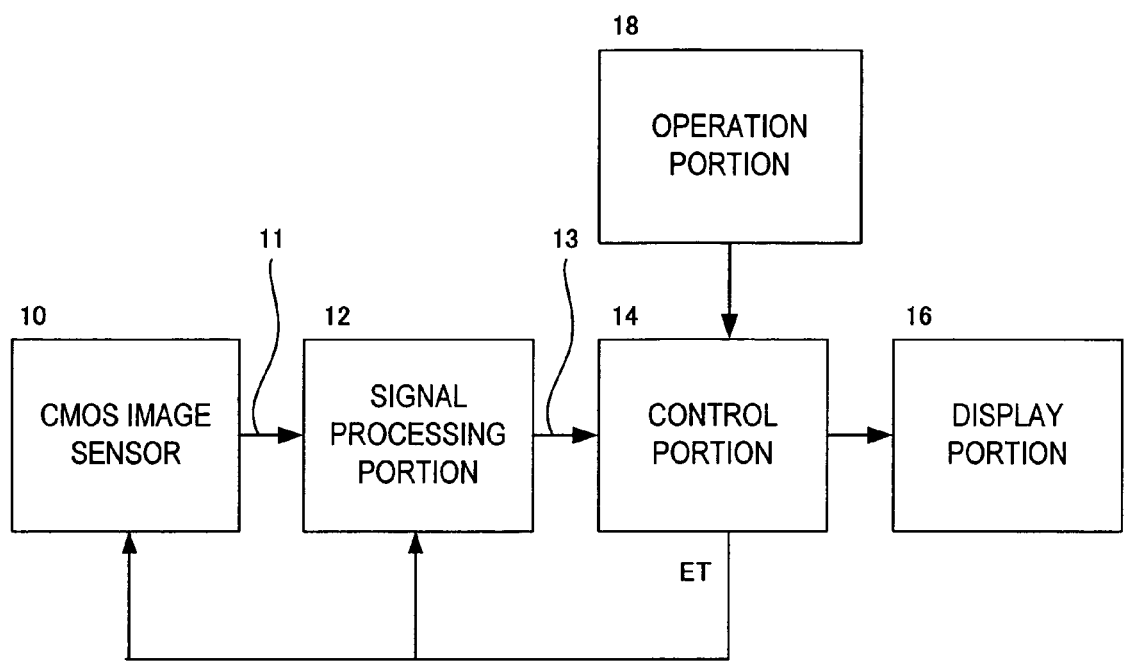
FIGS. 1A and 1B show the configuration of an image capture device of an embodiment, and horizontal stripes caused by flicker.

Below, embodiments of the invention are explained referring to the drawings. However, the technical scope of the invention is not limited to the embodiments, but extends to the inventions described in the scope of Claims, and to inventions equivalent thereto.

FIG. 1 shows the configuration of the image capture device of one embodiment, and horizontal stripes due to flicker. The image capture device shown in FIG. 1A has a CMOS image sensor 10, which is a MOS-type image capture element; a signal processing portion 12, which performs noise removal processing using CDS (correlation double sampling), A/D conversion processing, smoothing processing, and other signal processing on the image signals 11 output from the CMOS image sensor 10; a control portion 14, which detects the flicker component signals included in the digital image signals 13 output from the signal processing portion 12, and based on these signals executes exposure control; a display portion 16, comprising a liquid crystal panel, organic EL panel, or other device, display on which is controlled by the control portion; and an operation portion 18 having a shutter or other operation means. The control portion 14 comprises a microprocessor, and in this aspect has a flicker detection portion, an exposure control portion which computes the exposure time ET based on the flicker frequency or period detected by the flicker detection portion, and a display control portion which controls display on the display portion 16.

In the CMOS image sensor, pixels, each having a photodiode or other photoelectric conversion element and a transistor which amplifies the voltage resulting from the photoelectric conversion, are arranged in a matrix, and the voltage amplified within each pixel is output, via a selection transistor provided for each pixel, to a data line extending in the vertical direction. The selection transistors are selected in succession by means of scan lines extending in the horizontal direction, so that the voltages within pixels are output to data lines. Image signals output to a plurality of data lines are output in sequence to the signal processing portion 12.

Thus the CMOS image sensor is an XY address-type image capture element, and the image signals in pixels are output according to the scan timing of scan lines. Hence the image capture intervals of the image signals for different rows are shifted. Consequently, when an image is captured in a fluorescent lighting environment the brightness in which changes periodically corresponding to the commercial power supply frequency, the periodically varying fluorescent light brightness is contained in the image signals of each row. Moreover, because the image capture intervals are shifted between rows, the effect of the change in brightness of the fluorescent lighting is different for each row, and so horizontal stripes exist in the captured image.

Figure 1B:
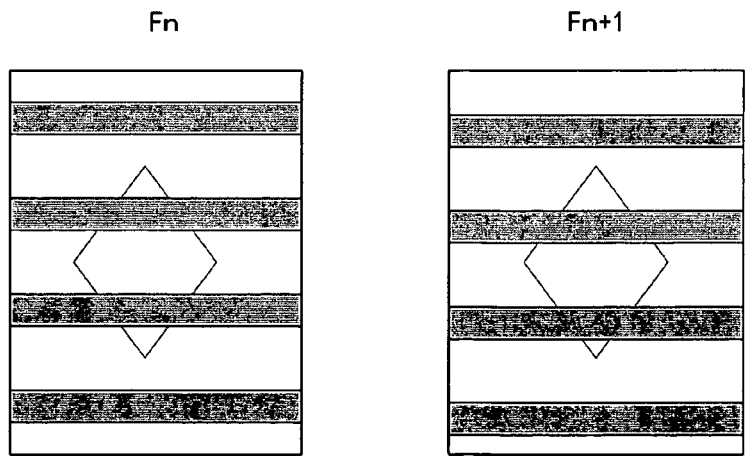

In FIG. 1B shows horizontal stripes due to flicker. In a frame period Fn, the image signals comprise four horizontal stripes and a diamond-shaped object. In the case of a 50 Hz commercial power supply, the positive- and negative-polarity maximum values of the power supply voltage occur at $1/100$ second intervals, so that the brightness of the fluorescent lighting changes with a period of $1/100$ second. Hence if scanning of all the scan lines in the sensor occurs in $4/100$ second, then four horizontal stripes occur. On the other hand, in the next frame period Fn+1, the horizontal stripes are shifted slightly in the vertical direction.

When the fluorescent lighting flicker period is $1/100$ second, if the exposure time (shutter speed) is set to N/100 second, which is an integral multiple of the flicker period, then the cumulative values of the light flux from the fluorescent lighting incident on the pixels of each row are all equal, so that even if there exists illumination lighting the brightness of which changes periodically due to flicker, the above-described horizontal stripes are not generated. That is, when the exposure time differs from an integral multiple of the flicker period, the light flux from fluorescent lighting incident on the pixels of each row is different, and so horizontal stripes tend to appear. When the commercial power supply is 60 Hz, the fluorescent lighting brightness changes with a period of $1/120$ second.

Figure 2:
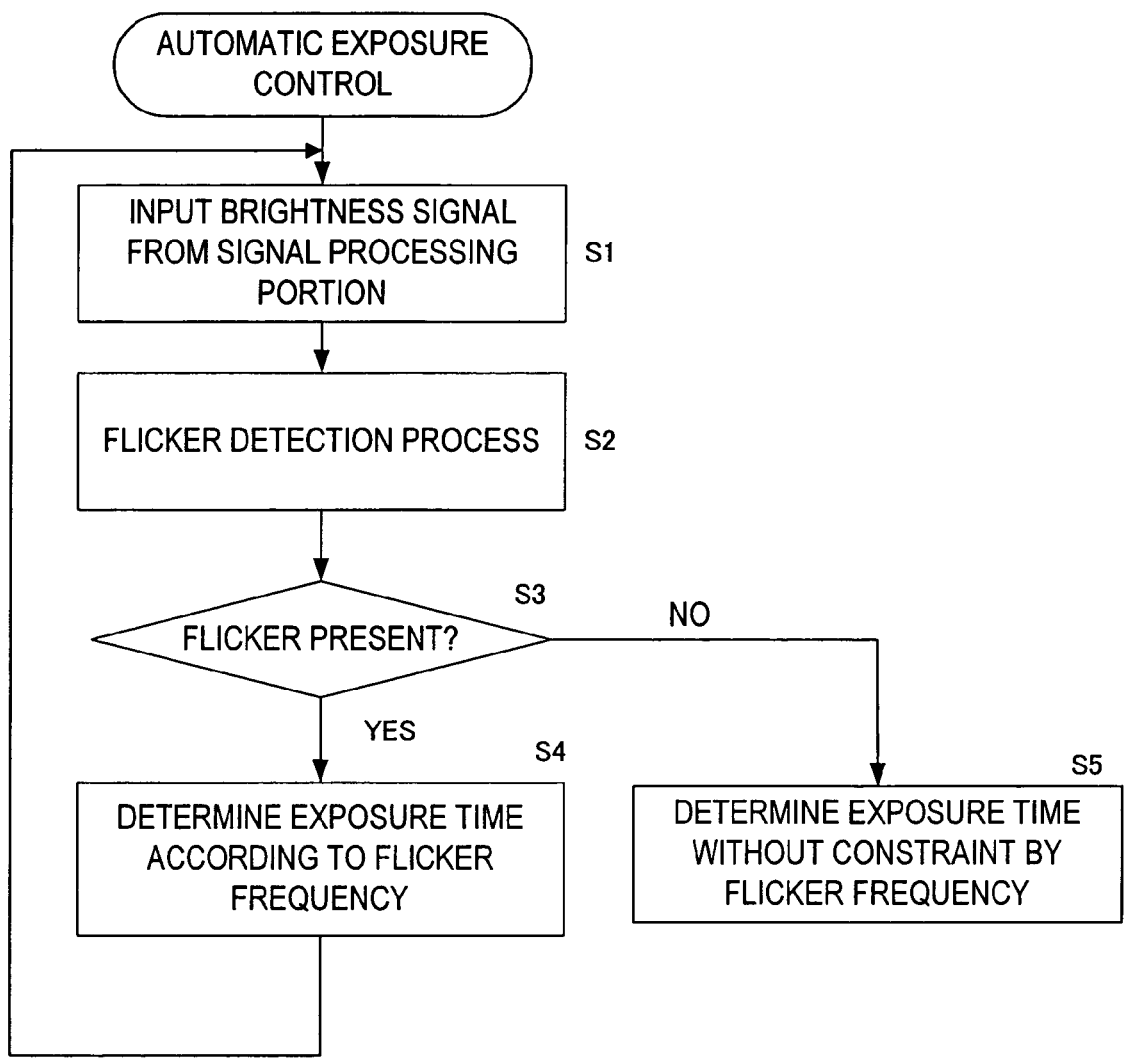
FIG. 2 is a flowchart of an automated exposure control process by the control portion 14.

FIG. 2 is a flowchart of an automated exposure control process by the control portion 14. The control portion 14 input the digital image signals 13 from the signal processing portion 12 which have been subjected to signal processing, and stores the signals in frame units in internal frame memory (S1). Then, the image signals are analyzed, and the existence of flicker and the flicker frequency (or period) are detected (S2). When flicker exists ("YES" in S3), the exposure time ET corresponding to the flicker frequency is determined (S4). That is, as explained above, the exposure time ET is set equal to an integral multiple of the flicker period. If on the other hand flicker does not exist ("NO" in S3), the exposure time is determined without any constraints imposed by a flicker frequency (S5). That is, the exposure time can be set to the optimum exposure time corresponding to the image brightness, or to an exposure time (shutter speed) specified using the operation portion 18.

Thus when flicker exists, it is necessary to set the exposure time to the exposure time closest to the optimum exposure time corresponding to the image brightness or to a specified exposure time, with the constraint that the exposure time is an integral multiple of the flicker period. Hence it is desirable that flicker detection be performed within a minimum necessary range.

Figure 3:
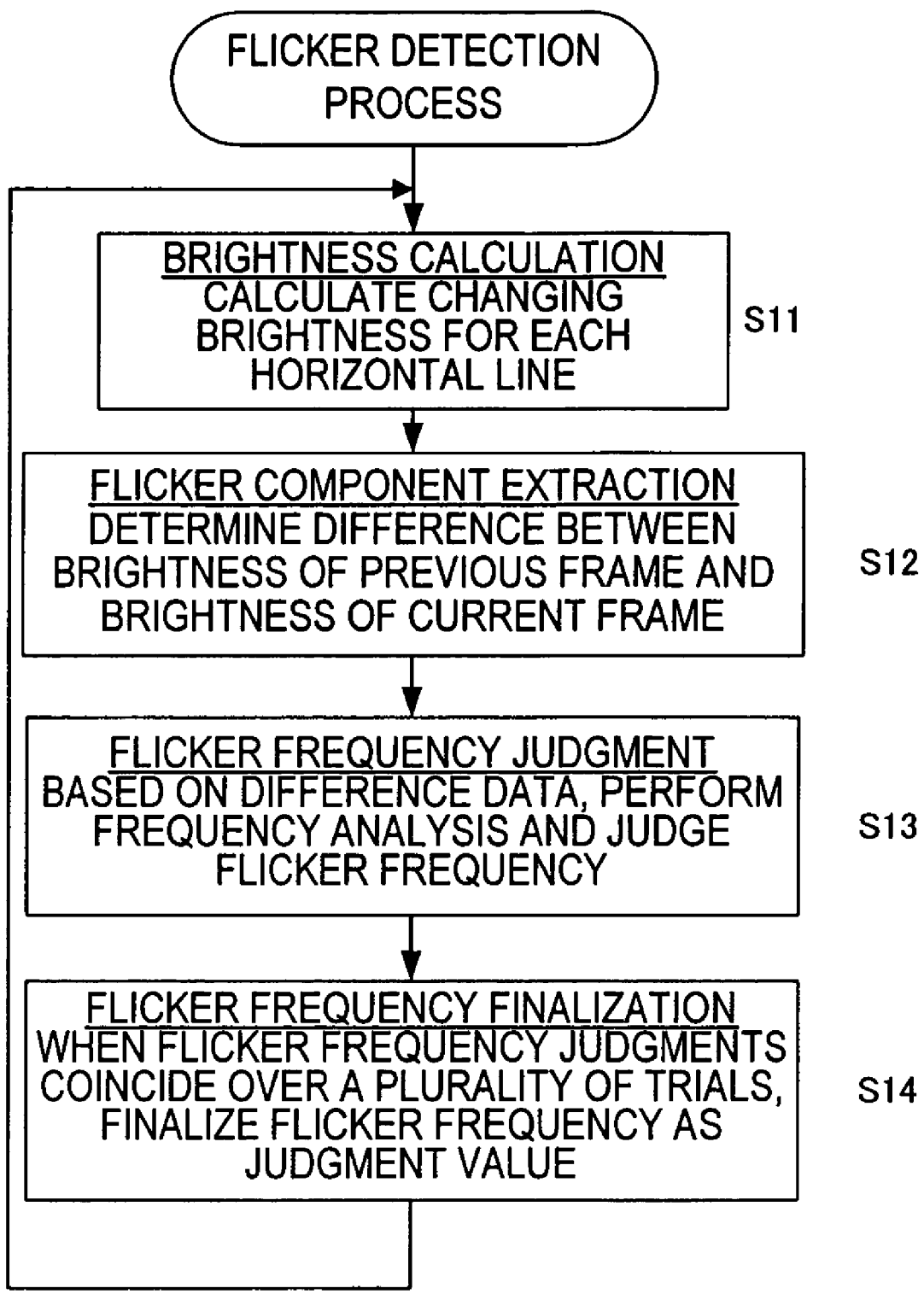
FIG. 3 is a flowchart of a flicker detection process by the control portion 14.

FIG. 3 is a flowchart of a flicker detection process by the control portion 14. The flicker detection process is equivalent to the method described in Japanese Patent Laid-open No. 2003-189129. That is, the change in brightness with each horizontal line is computed for the image signals of the first frame (S11). The cumulative value of the image signals in each horizontal line becomes the brightness of that line. Alternatively, each frame may also be divided into a plurality of horizontal regions, and the cumulative value of the image signals for the plurality of lines in each horizontal region is calculated.

Next, the difference between the brightness of each horizontal line or the brightness of each horizontal region in the previous frame, and the brightness of each horizontal line or the brightness of each horizontal region in the current frame, is determined (S12). As shown in FIG. 1B, an object in consecutive frames is normally equivalent, so that by determining the difference in brightness of image signals in preceding and following frames, the flicker component alone is obtained, with the brightness component for the object removed. Hence it is sufficient to detect whether horizontal stripes due to flicker exist in the difference data; if such stripes exist, then by detecting the number of horizontal stripes, the flicker frequency (or period) can be detected.

In process S13 frequency analysis is performed based on the difference data, and the existence of flicker, and the flicker frequency (or period) are discriminated. In discriminating the flicker frequency, the "peaks" and "valleys" of the difference data which change with time. (vertical direction in a frame image) are detected, and the number of peaks and valleys are counted, or the intervals therebetween are detected. This flicker frequency discrimination process is discussed in greater detail below. Finally, in order to confirm the discriminated flicker frequency, the flicker frequency is discriminated over a plurality of trials, and when the discriminated flicker frequency coincides over a number of trials, the coinciding flicker frequency is taken to be the discriminated flicker frequency (S14).

FIG. 4 is a flowchart of a flicker frequency discrimination process of an embodiment. This flicker frequency discrimination process shows in specific detail the process S13 in FIG. 3. That is, the difference components of image signals in preceding and succeeding frames are taken to be flicker components, the two types of correction processing S21, S22 are performed on these flicker component signals, and three states—"peak", "valley", and "other"—are judged for this corrected data (three-value judgment, S23), and from the numbers and intervals of "peaks" and "valleys", the flicker frequency is discriminated (S24). Correction processing includes processing to remove low-amplitude components (S21), and processing to remove high-amplitude components (S22), from flicker component signals, which are first difference data. The processing may be performed in the reverse order as well. By removing low-amplitude components, the unnecessary detection as flicker of weak flicker components, such as that due to incandescent lighting, can be avoided. By removing high-amplitude components, even when the difference data contains high-brightness components, these can be appropriately removed, enabling discrimination of "peaks" and "valleys".

In the processing of S23 to decide between "peaks", "valleys" and "other", average values of the corrected flicker component signals for each period are computed, and maxima with maximum values larger than the average value are judged to be "peaks", while minima with minimum values smaller than the average are judged to be "valleys". By this means, flicker components are not overlooked even when signals contain high-brightness components. Maximum-value maxima can be identified by detecting the zero-cross point at which the value of the derivative changes from positive to negative; minimum-value minima can be identified by detecting the zero-cross point at which the value of the derivative changes from negative to positive.

The processing shown in FIG. 2, FIG. 3 and FIG. 4 is performed by executing a judgment program, incorporated within the processor comprised by the control portion 14.

Figure 5A:
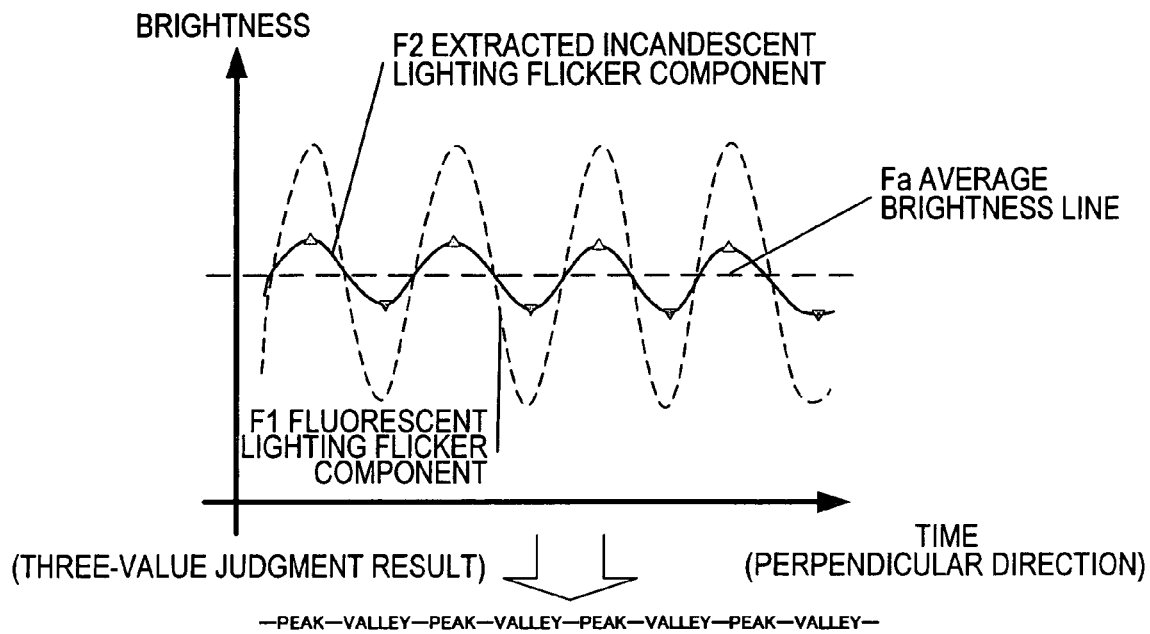
FIGS. 5A and 5B show the correction processing for low-amplitude component removal in the flicker frequency discrimination process of a first embodiment.

FIG. 5 shows the correction processing for low-amplitude component removal in the flicker frequency discrimination process of a first embodiment. In FIG. 5A, the flicker component signal extracted by taking the difference in the image signals for preceding and succeeding frames is shown. The broken line is the flicker component F1 for fluorescent lighting; the solid line is the flicker component F2 for incandescent lighting. Compared with the fluorescent lighting flicker component F1, the incandescent lighting flicker component F2 is weak, with an extremely small amplitude.

Identification of the frequency (50 Hz, 60 Hz) or period of a flicker component is performed by detecting the positions of the signal peaks and valleys. Various methods for detecting signal peak and valley positions are conceivable; in general, positions at which the derivative value of the brightness value with respect to time on the horizontal axis (perpendicular to the image) become zero are detected as peaks (maxima) or valleys (minima). Zero-cross points at which the derivative changes from positive to negative are detected as peaks (maximum values), and zero-cross points at which the derivative changes from negative to positive are detected as valleys (minimum values). Or, by discriminating zero-cross points from positive to negative at which the brightness is higher than the average brightness Fa as peaks, and zero-cross points from negative to positive at which the brightness is lower than the average brightness as valleys, the peaks and valleys due to noise can be excluded from flicker peak and valley judgment results. This average brightness Fa can be determined by taking the midpoint between the maximum brightness and minimum brightness.

When analyzing the incandescent lighting flicker component F2 using this method, the results of three-valued decisions to detect "peaks", "valleys" and "other" occur with alternations between peaks and valleys, as shown in FIG. 5A. Consequently a frequency or period equal to that of the fluorescent lighting flicker component is detected, and the analysis results indicate the existence of flicker as well as a prescribed value for the flicker frequency or period.

However, the flicker component due to incandescent lighting is weak compared with that due to fluorescent lighting, and so horizontal stripes sufficiently intense to be recognized are not generated in the image. Hence it is desirable that the flicker component due to incandescent lighting be ignored, and that the exposure time be controlled without constraints imposed by this component. This is because when a flicker component is detected, the exposure time must be controlled so as to be an integral multiple of the period, and so the exposure time cannot be set to an exposure time appropriate to the object, or to the exposure time desired by the operator.

Figure 5B:
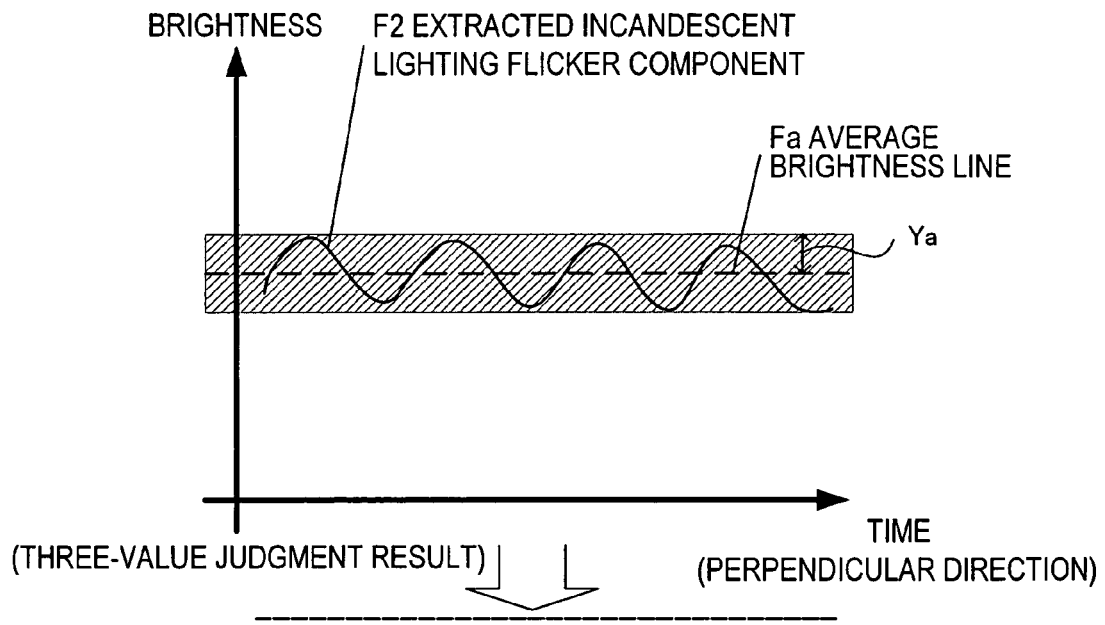

In this embodiment, correction processing is performed in order to remove the flicker component F2 due to incandescent lighting from the difference signal. As shown in FIG. 5B, the average brightness line Fa of the flicker component is determined, and signal components smaller than the reference low amplitude Ya are removed from the average brightness line Fa. Or, values other than peaks and valleys are set for signal components smaller than the reference low amplitude Ya, so that in the three-value judgments described below, peaks and valleys are not detected. As a result, even if incandescent lighting flicker components are contained in the difference signals, such weak signals are removed by correction processing which removes low-amplitude components, so that flicker is not judged to exist unnecessarily. Thus in this embodiment, filter processing to cut low-amplitude noise is performed as part of correction processing.

Figure 6A:
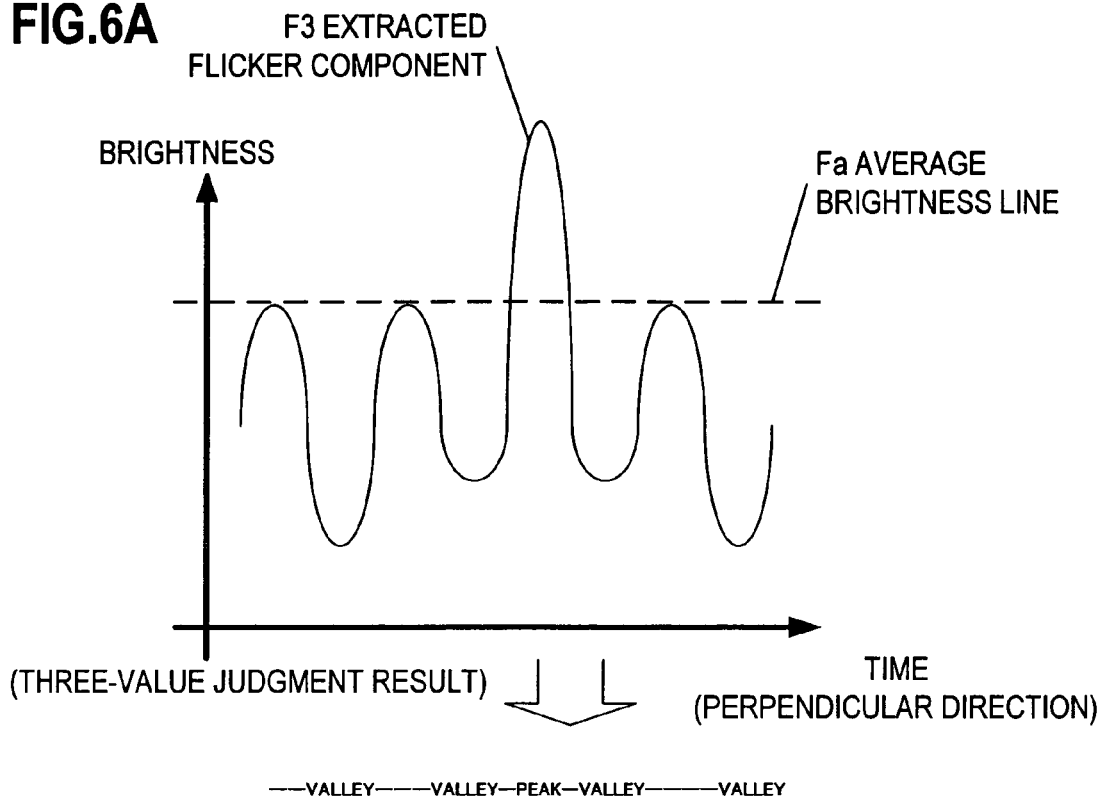
FIGS. 6A and 6B show the correction processing for high-amplitude component removal in the flicker frequency discrimination process of a second embodiment.

FIG. 6 shows the correction processing for high-amplitude component removal in the flicker frequency discrimination process of a second embodiment. FIG. 6A shows the fluorescent lighting flicker component F3 extracted as the difference signal. In this example, high-brightness image signals exist in places in only one frame image among two successive frame images. This situation is thought to occur when an object is in rapid motion, or when the camera direction moves rapidly. Hence the difference signals of the image signals of successive frames are, in places, high-amplitude signals. In the flicker component F3 in FIG. 6A, the amplitude of the third peak from the left protrudes higher than the other peak amplitudes. As a result, the average brightness line Fa is higher than the amplitudes of all other peaks.

When the above-described three-value judgments are performed on such a flicker component F3, even zero-cross points at which the derivative changes from positive to negative are not judged to be peaks if the amplitude is smaller than the average brightness line Fa; as a result, four valleys and only one peak are detected, and the flicker component due to fluorescent lighting cannot be judged accurately.

Figure 6B:
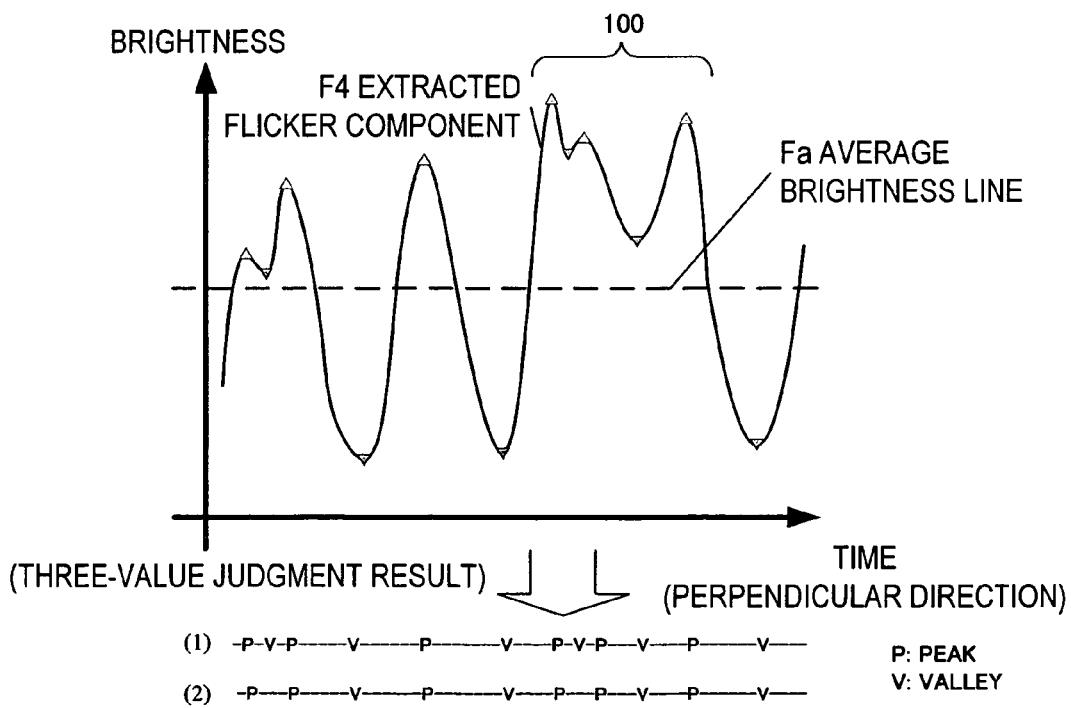

A separate fluorescent lighting flicker component F4 comprising a difference signal is shown in FIG. 6B. In this example also, high-brightness image signals exist in places in only one frame image among two successive frame images. In the drawing, high-brightness image signals exist in the portion 100, and the high-brightness component is included in the flicker component F4. Also in the portion 100, a portion which would normally be a valley is higher than the average brightness line Fa. Further, the waveform is distorted in the portion 100.

When performing three-value judgments of such a flicker component F4 using the zero crossings of the derivative value, the judgment results (1) in FIG. 6B are "peak, valley, peak, valley, peak, valley, peak, valley, peak, valley, peak, valley"; when only brightnesses higher than the average brightness line Fa are taken to be "peaks" and only brightnesses lower than the line are judged to be "valleys", then the judgment results (2) in FIG. 6B are "peak, peak, valley, peak, valley, peak, peak, peak, valley".

FIG. 7 shows the flicker component after peak/valley judgment of the flicker component in FIG. 6B. The broken line is the flicker component signal after peak/valley judgment. FIG. 7A shows the flicker component F5 after peak/valley judgment (broken line) and the flicker component F4 extracted as a difference signal. In the judgment results (2) of FIG. 6B, for continuously detected peaks, by judging a point having a maximum brightness to be a "peak", the flicker component F5 of FIG. 7A can be extracted.

FIG. 7B contrasts the flicker component F5 extracted in this way and an actual fluorescent lighting flicker component F1. As seen in the figure, the three-value judgment result for the discriminated flicker component F5 is indicated by (1), whereas, the three-value judgment result for the actual flicker component F1 is indicated by (2). That is, the flicker component extracted by taking the difference contains a high-brightness signal in the portion 100, so that the waveform of the three-value flicker component F5 is disturbed in this portion, and peaks and valleys which should be detected are not detected. Hence in the flicker detection process, flicker at the anticipated frequency is not detected, and it is expected that an erroneous judgment that no flicker is present may result.

Hence in the second embodiment, in addition to the correction processing to remove low-amplitude components of the first embodiment, correction processing to remove high-amplitude components is also performed on the flicker component F4 extracted from the difference between the image signals of successive frames. That is, the correction processing of S21 and S22 in FIG. 4 is performed.

Figure 8A:
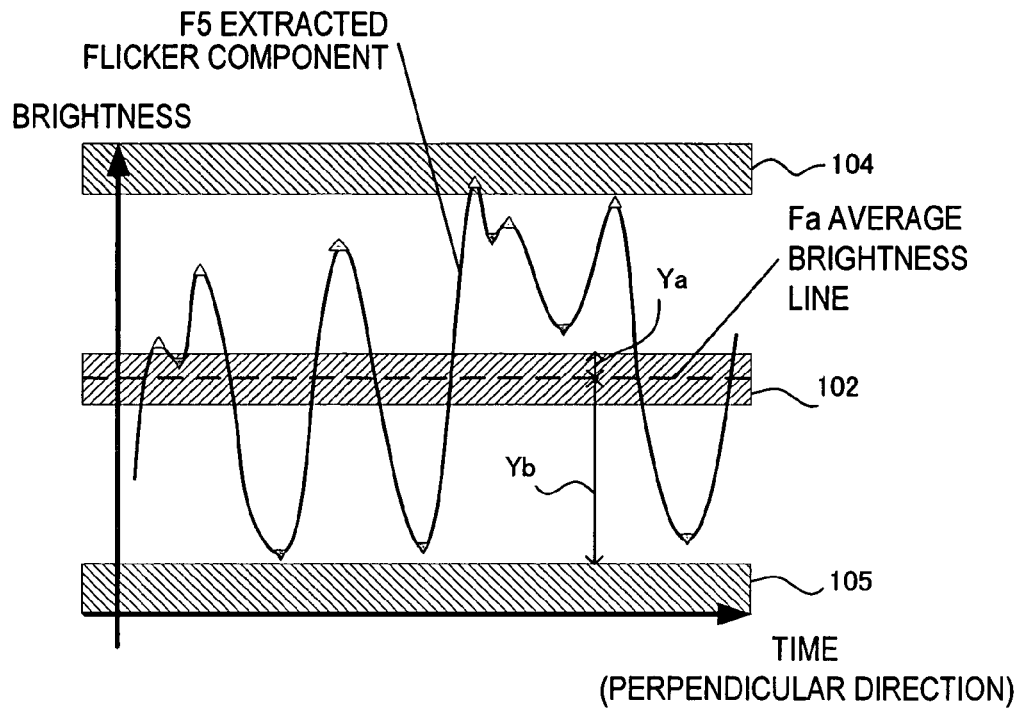
FIGS. 8A and 8B show correction processing in the second embodiment.
Figure 8B:
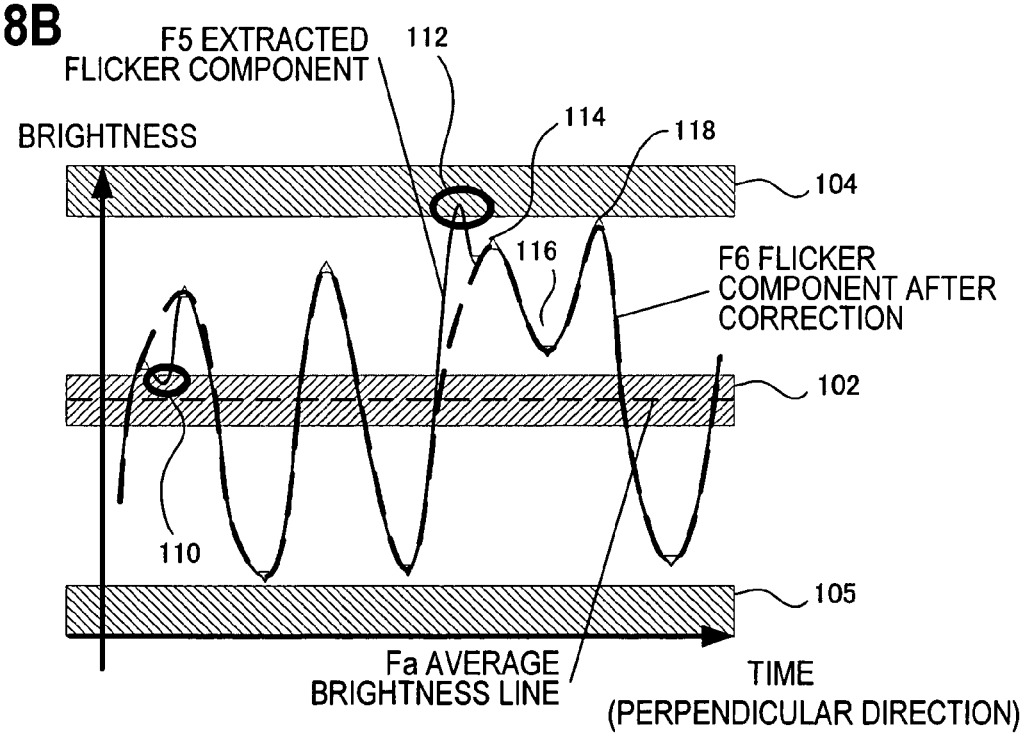

FIG. 8 shows the correction processing of the second embodiment. In FIG. 8A, the flicker component F5, which is the same difference signal as in FIG. 6B, is shown. In the second embodiment, of the signals F5 of this flicker component, components below the reference low-amplitude value Ya from the brightness average value Fa are removed, and components above the reference high-brightness value Yb from the brightness average value Fa are removed. The former is correction processing to remove low-amplitude components, and the latter is correction processing to remove high-amplitude components. As a result, the low amplitudes 110 and high amplitudes 112 in FIG. 8B are removed. Or, for the flicker components F5, the low amplitudes 110 and high amplitudes 112 may be categorized as "other", separate from the "peaks" and "valleys". The broken line in the figure shows the flicker component F6 after correction processing to remove these low amplitudes 110 and high amplitudes 112.

It is desirable that the above reference low-amplitude value Ya be set to a fixed value corresponding to incandescent lighting; but because the amplitude values of high-brightness signals differ, the reference high-amplitude value Yb may be varied from frame to frame.

In the corrected flicker component F6 represented by the broken line in FIG. 8B, the high-amplitude component 112 has been removed and the peak 114, valley 116, and peak 118 exist. The peaks and valley can be detected through the zero-cross points of the derivative value. Here, if points at which the brightness is higher than the average brightness line Fa are designated peaks, and points at which the brightness is lower are designated valleys, then the valley 116 is not discriminated. Hence the valley 116 of the actual flicker component is not discriminated as valley, and so the existence of a flicker component and its frequency (or period) cannot be detected appropriately.

Figure 9A:
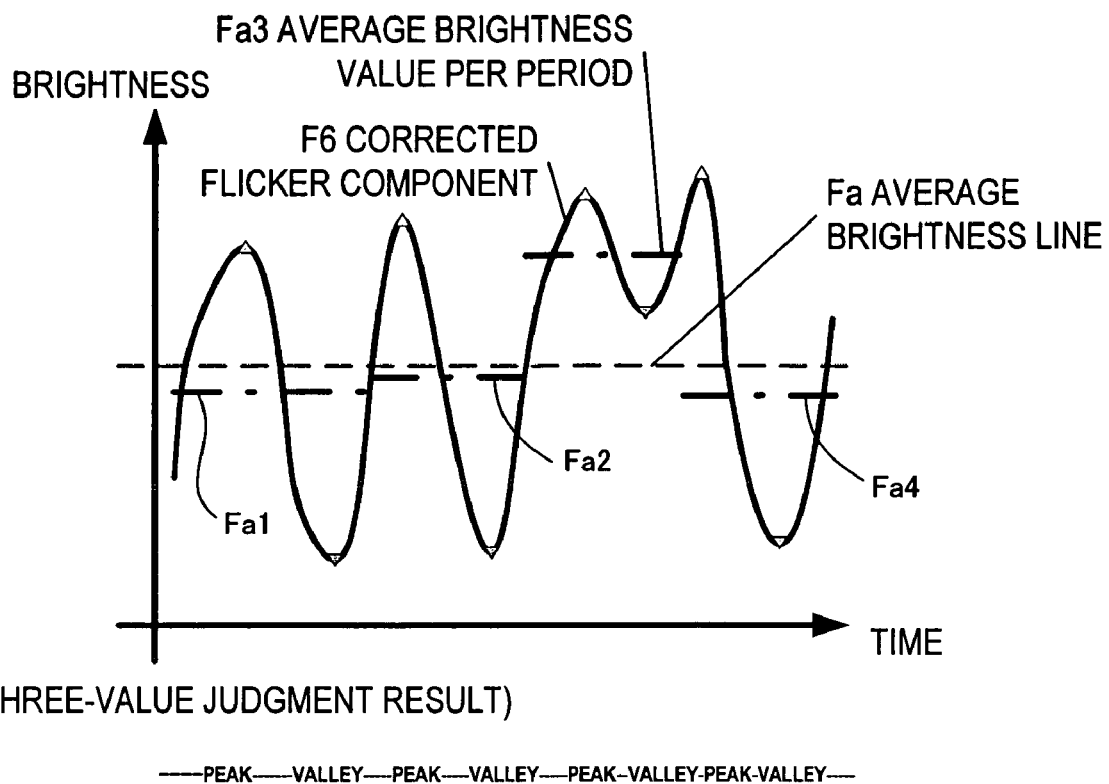
FIGS. 9A and 9B explain the flicker judgment process in a third embodiment.

FIG. 9 explains the flicker judgment process in a third embodiment. This flicker judgment process relates primarily to improvement of the three-value judgment processing. The flicker component after correction processing F6 of FIG. 8 is shown in FIG. 9A. In the third embodiment, "peaks" and "valleys" are detected based on zero-cross points of the derivative value of the corrected flicker component F6, and the period of the flicker component F6 is provisionally detected. The average brightness values Fa1 to Fa4 within the provisionally detected periods are then determined. The average brightness values are computed as, for example, the averages of the maximum and minimum values within each period. Then, the "peaks" and "valleys" detected from the zero-cross points of the derivative value are discriminated as "peaks" for maxima larger than, and as "valleys" for minima smaller than, the average brightness values Fa1 to Fa4 of the corresponding periods. The results of three-value judgment performed as described above appear in FIG. 9A.

Figure 9B:
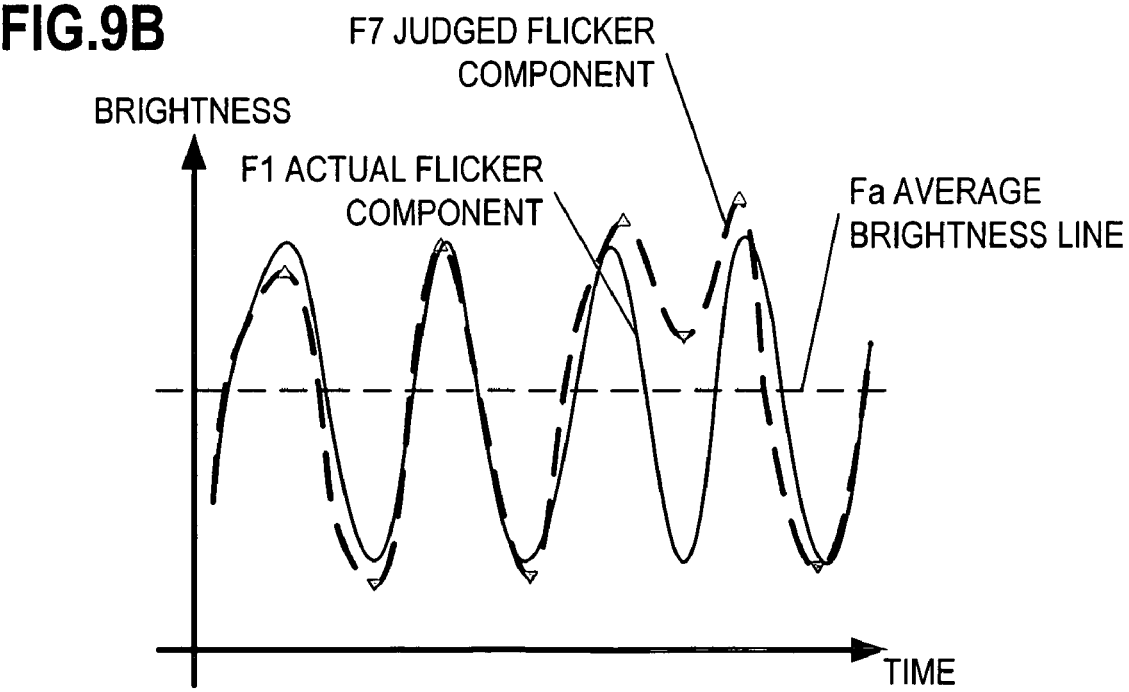

In FIG. 9B, the flicker component F7 discriminated as described above (broken line) and the actual flicker component F1 (solid line) are shown superposed. As is clear from this figure, "valleys" are discriminated even when the level is higher than the average brightness line Fa, so that although the waveform is distorted, the discriminated flicker component F7 can be used to detect "peaks" and "valleys" equivalent to the frequency (or period) of the actual flicker component.

Returning to FIG. 4, after performing the three-value judgment S23 based on the brightness average values for each period, the flicker component frequency (or period) is judged based on the interval and number of discriminated "peaks" and "valleys" (S24). And, as in process S14 of FIG. 3, flicker frequency values judged a plurality of times are taken as criteria to finalize a value, and the exposure time corresponding to the flicker frequency of FIG. 2 is determined (S4). When flicker is not detected, the exposure time is determined without any constraints imposed by a flicker frequency (S5).

As explained above, in this embodiment the differences between image signals in successive frames are determined to extract flicker components, correction processing of the flicker component signals is performed, including low amplitude removal and high amplitude removal, and in three-value judgments average brightness values for each period are determined, and based on the average brightness values, corrected signals are discriminated as "peaks" or "valleys". By discriminating "peaks" and "valleys" with reference to average brightness values, points at which the derivative crosses zero due to noise can be excluded from "peaks" and "valleys". Further, by using average brightness values over each period rather than an overall average brightness value, flicker components can be reliably discriminated even when signal distortion occurs due to the inclusion of high-brightness image signals.

In the above, explanations were given for examples of CMOS image sensors or other MOS-type image capture elements; but in addition to other MOS-type image capture elements, this invention can of course also be applied to CCDs and other image capture elements, so long as an XY address method is used.

What is claimed is:

1. An image capture device, having an image capture element, the device comprising:
   a flicker detection portion, which extracts flicker component signals corresponding to periodic changes in brightness in the image capture environment from image signals for each frame supplied by an image capture element, performs correction to remove signals at or below a prescribed reference low-amplitude value from the flicker component signals, and detects the frequency or the period of the flicker component from the peaks and valleys of the corrected flicker component signals.

2. The image capture device according to claim 1, wherein the flicker detection portion, in addition to performing correction processing to remove signals at or below the prescribed reference low-amplitude value, also performs correction processing to remove signals at or above a prescribed reference high-amplitude value from the flicker component signals.

3. The image capture device according to claim 1, wherein the flicker detection portion discriminates between peaks and valleys in the flicker component signals with reference to the average value in each period of the corrected flicker component signals, and detects the flicker component frequency or period from the discriminated peaks and valleys.

4. The image capture device according to claim 3, wherein the flicker detection portion performs extraction of the flicker component signals by determining difference component between image signals in successive frames.

5. The image capture device according to claim 1, wherein the flicker detection portion performs smoothing processing on the extracted flicker component signals, and thereafter performs the correction processing.

6. The image capture device according to claim 1, further comprising an exposure time control portion, which controls an exposure time according to the frequency or period of the flicker component detected by the flicker detection portion.

7. An image capture device, having an image capture element, the device comprising:
   a flicker detection portion, which extracts flicker component signals corresponding to periodic changes in brightness in the image capture environment from image signals for each frame supplied by an image capture element, performs correction to remove signals at or above a prescribed reference high-amplitude value from the flicker component signals, and detects the frequency or the period of the flicker component from the peaks and valleys of the corrected flicker component signals.

8. The image capture device according to claim 7, wherein the flicker detection portion discriminates between peaks and valleys in the flicker component signals with reference to the average value in each period of the corrected flicker component signals, and detects the flicker component frequency or period from the discriminated peaks and valleys.

9. An image capture device, having an image capture element, the device comprising:
   a flicker detection portion, which extracts flicker component signals corresponding to periodic changes in brightness in the image capture environment from image signals for each frame supplied by an image capture element, discriminates between peaks and valleys of flicker component signals with reference to average values of the flicker component signals in each period, and detects the flicker component frequency or period from the discriminated peaks and valleys.

* * * * *